US005673831A

United States Patent [19]
Spratt

[11] Patent Number: 5,673,831
[45] Date of Patent: Oct. 7, 1997

[54] TIP DOWN VEHICLE TOP CARRIER

[76] Inventor: William L. Spratt, HCR 65, Box 218-1, Pryor, Okla. 74361

[21] Appl. No.: 696,690

[22] Filed: Aug. 14, 1996

[51] Int. Cl.$^6$ .................................................. B60R 9/042
[52] U.S. Cl. ........................................ 224/310; 224/281
[58] Field of Search .................................... 224/310, 329, 224/326, 327, 280, 281, 324, 325, 314, 322; 414/462, 463

[56] References Cited

U.S. PATENT DOCUMENTS

| | | | |
|---|---|---|---|
| D. 210,451 | 3/1968 | Gardner. | |
| 3,828,993 | 8/1974 | Carter | 224/924 |
| 4,291,823 | 9/1981 | Freeman et al.. | |
| 4,339,223 | 7/1982 | Goize. | |
| 4,350,471 | 9/1982 | Lehmann. | |
| 4,446,998 | 5/1984 | Taig. | |
| 4,516,709 | 5/1985 | Bott | 224/325 |
| 4,682,719 | 7/1987 | Ernst et al.. | |
| 4,867,362 | 9/1989 | Finnegan et al.. | |
| 5,257,710 | 11/1993 | Cropley | 224/322 |
| 5,348,207 | 9/1994 | Frank. | |
| 5,360,150 | 11/1994 | Praz. | |
| 5,417,358 | 5/1995 | Haselgrove | 224/310 |
| 5,419,479 | 5/1995 | Evels et al. | 224/322 |
| 5,505,579 | 4/1996 | Ray et al. | 224/310 |

*Primary Examiner*—Henry J. Recla
*Assistant Examiner*—Charles R. Eloshway
*Attorney, Agent, or Firm*—Richard C. Litman

[57] ABSTRACT

A tip down vehicle top carrier having a removable base frame attached to the top of a vehicle. Attached to the base frame in a sliding relationship is a roller platform. Secured to the roller platform are various carrier devices such as a luggage box, ski rack, bike rack, tool box, or specialty equipment racks. The roller platform holding the cargo will not tip down until the platform is fully extended because of the configuration of the pivot wheels (breakover point) and the torsion spring axle. Once the roller platform is fully extended with a full load, it will gradually tip down as it increases the torque resistance of the torsion springs. If the roller platform is empty the user pulls it down using their own weight which "loads up" the torsion springs. Once the carrier is loaded the latches are released and the torsion spring system allows the roller platform and carrier to be raised back into a horizontal position with a minimum amount of force exerted by the user if fully loaded, or zero force when the load is less than the total lifting torque of the springs. The lifting capacity of the carrier is a function of the number and torque rating of the torsion springs used.

6 Claims, 5 Drawing Sheets

TIP DOWN VEHICLE TOP CARRIER

BACKGROUND OF THE INVENTION

1. Field of the Invention

The present invention relates generally to vehicle storage carriers. More specifically, the invention relates to a tip down vehicle top storage carrier that requires a minimum amount of force to lift up or down the entire load of the carrier.

2. Description of the Prior Art

Throughout this country and the world many travelers prefer to use their own vehicles when traveling long distances. They enjoy having the opportunity to see the country and converse with people from the different regions. Traveling by vehicle affords them the luxury of traveling on their own time table and at their own leisure. The hassles and long lines associated with air travel are thankfully avoided. However, when traveling by vehicle the storage of luggage is a major concern. Care must be taken so that all available space is maximized. Unfortunately, a great number of vehicles do not offer a lot of interior space especially when the number of occupants (i.e. family members) is factored in. To alleviate this problem many travelers use vehicle top carriers to store their luggage.

The existing vehicle top carriers of today are mounted in a fixed position on top of the vehicle. As would be expected, loading the vehicle top carriers requires lifting the luggage overhead in addition to lifting and holding open the carrier lid. If the luggage or box to be stored is heavy, it can be difficult to impossible for persons lacking in physical stature or strength to load the carriers.

Luggage carrier boxes are temporarily mounted within solid boxes made of fiberglass or aluminum and are removed from the vehicle when not traveling. This allows for a substantial reduction in air drag. In addition, the luggage boxes are usually unattractive which adds further incentive to remove the boxes when not in use. Bicycle and ski racks are normally left on the vehicle.

Travelers of all ages, heights, and physical strengths would appreciate a vehicle top carrier that would be easy to use, functional and versatile. Having the ability to roll the rack to the passenger side and then tipping it down to load or unload at waist level without requiring a great deal of strength would be very beneficial to all users. In addition, having a tip down luggage box or carrier that is designed around standard size luggage would greatly increase space and weight efficiency. There is, therefore, a need for a tip down vehicle top carrier that is versatile in use, and functional in design, easy to use, allows the user to lift up or down with a minimum amount of force exerted. There is also a need for a vehicle top carrier which is designed around standard size luggage to optimize space and weight and is an attractive addition to the vehicle. The present invention provides such a device.

Luggage carriers for vehicles have been described in the patent literature. For example, U.S. Pat. No. 4,291,823 issued to Freeman et al. on Sep. 29, 1981, U.S. Pat. No. 4,339,223 issued to Golze on Jul. 13, 1982, U.S. Pat. No. 4,350,471 issued to Lehmann on Sep. 21, 1982, U.S. Pat. No. 4,446,998 issued to Taig on May 8, 1984, U.S. Pat. No. 4,468,719 issued to Ernst et al. on Jul. 28, 1987, U.S. Pat. No. 5,348,207 issued to Frank on Sep. 20, 1994 and U.S. Pat. No. 5,360,150 issued to Praz on Nov. 1, 1994 all describe vehicle luggage carriers that facilitate loading and unloading of the cargo from a side or rear position. However, none of the above cited patents disclose or address the primary problem of having to physically lift up or down the entire load (including the luggage) while trying to position the carrier back on top of the vehicle. The springs, pneumatic or hydraulic cylinders described in the above patents work in one direction only and require added force to physically overcome both the weight of the load and the force of the spring or cylinders when operating in the opposite direction. This is opposite of the present invention which assists the user in both the pulling down and lifting up of the carrier.

U.S. Pat. No. 4,867,362 issued to Finnegan et al. on Sep. 19, 1989 and U.S. Pat. No. Des. 210,451 issued to Gardner on Mar. 12, 1968 both describe vehicle top carriers but fail to disclose a vehicle top carrier having means to lower the carrier such that it can be loaded or unloaded from either the side or rear of the vehicle.

None of the above inventions and patents, taken either singly or in combination, is seen to describe the instant invention as claimed.

SUMMARY OF THE INVENTION

Accordingly, it is a principal object of the invention to provide a vehicle top carrier capable of being tipped down to a loading or unloading position.

It is another object of the invention to provide a vehicle top carrier using a torsion spring design.

It is a further object of the invention to provide a vehicle top carrier designed to accommodate standard size luggage.

Still another object of the invention is to provide a vehicle top carrier that allows for an easy and quick change from a large volume luggage box to a sport equipment rack for bicycles or skis.

It is an object of the invention to provide improved elements and arrangements thereof in an apparatus for the purposes described which is inexpensive, dependable and fully effective in accomplishing its intended purposes.

It is again an object of the invention to accomplish easy lifting of a load without the use of exterior power sources such as pneumatics or hydraulics.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
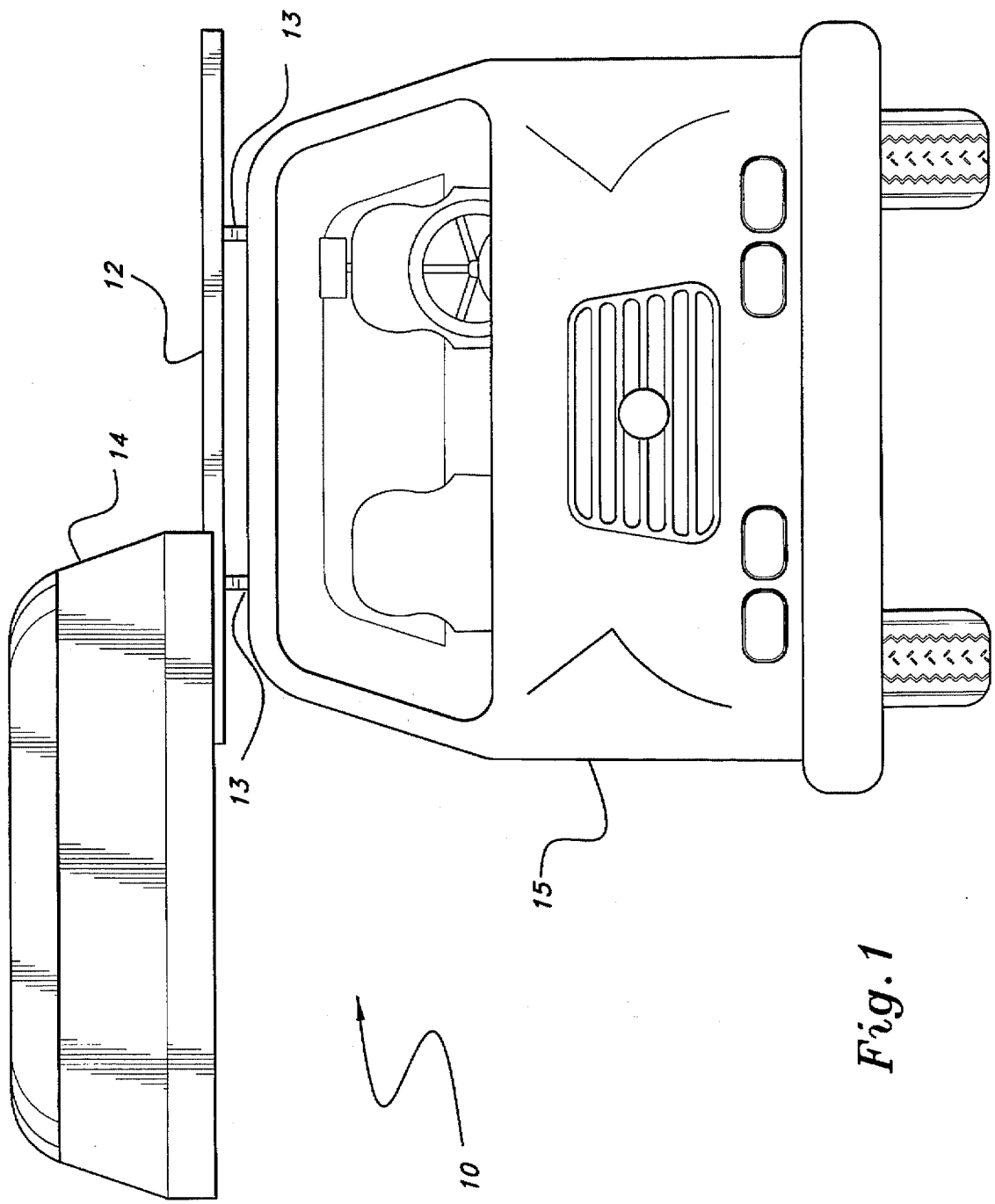
FIG. 1 is a front elevational view of the preferred embodiment of a vehicle top carrier according to the present invention.
Figure 2:
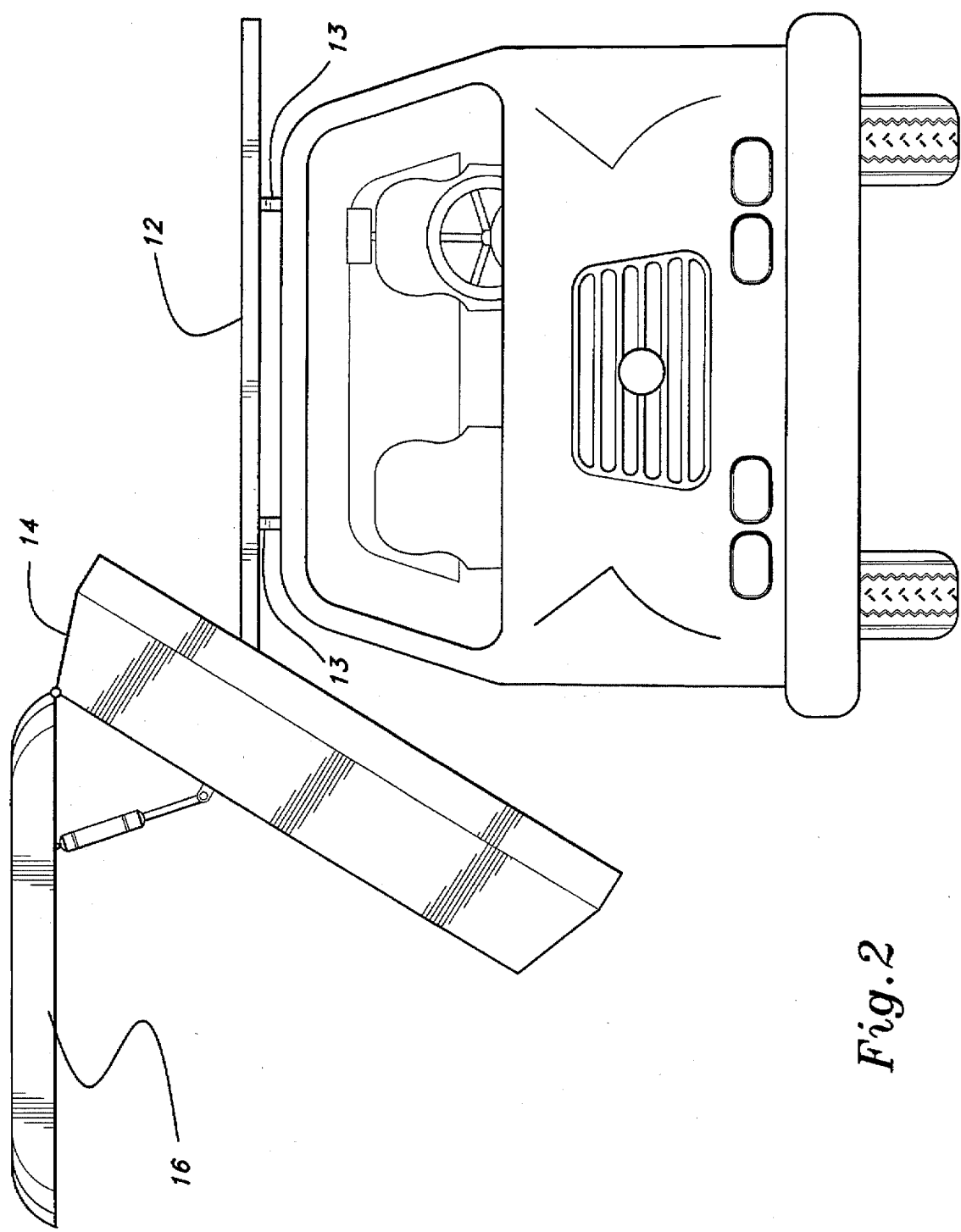
FIG. 2 is a front elevational view showing the carrier in the tip down position.
Figure 3:
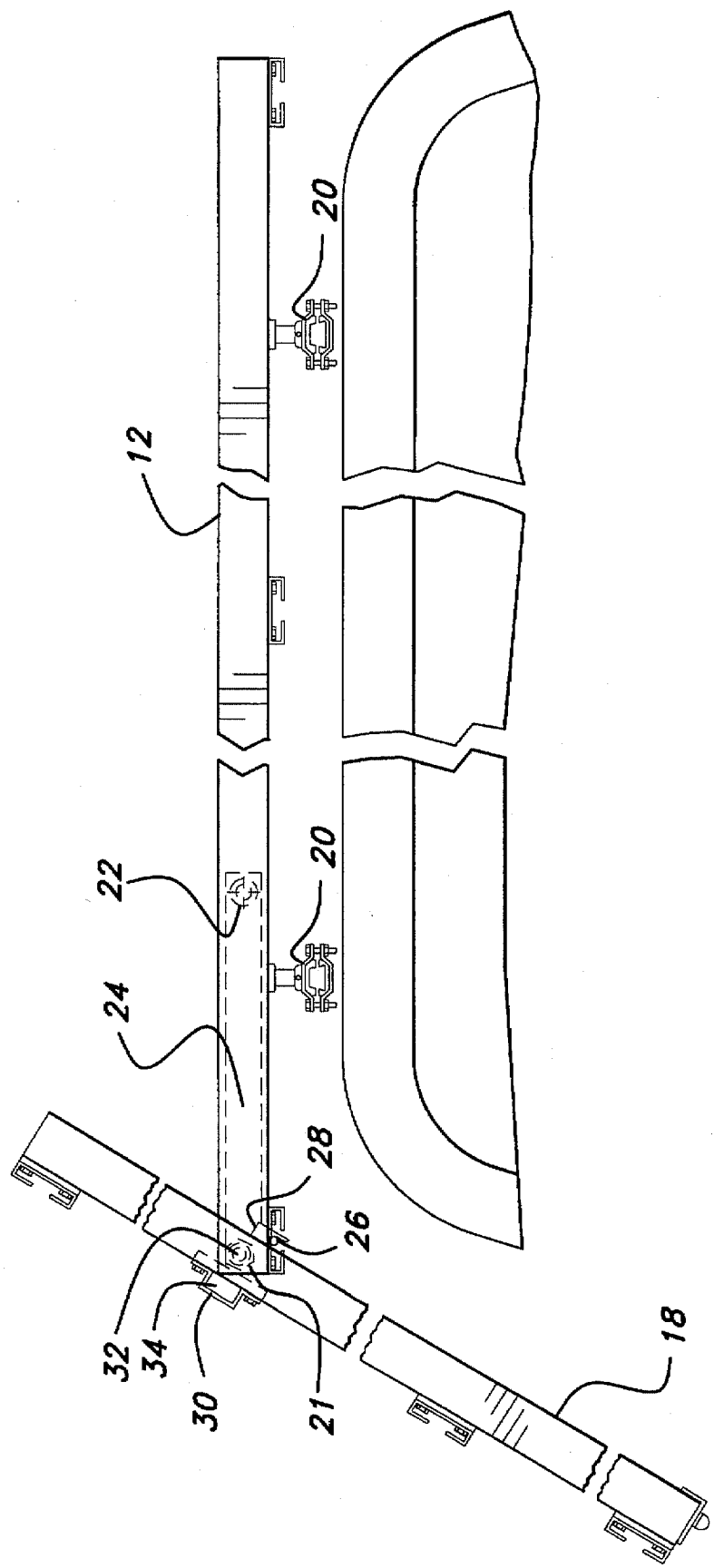
FIG. 3 is a front elevational view showing the vehicle top carrier frames in the tip down position.

Turning now to FIGS. 1, 2 and 3 of the drawings, tip down vehicle top carrier 10 is shown with carrier 14 in the extended position along base frame 12. Base frame 12 is secured to vehicle 15 via mounting blocks 13, mounting strips, or special attachment devices designed to attach to existing factory installed racks or to rain gutters. FIG. 2 shows carrier 14 in the tipped down position with carrier top 16 in the open position. Carrier 14 sits upon roller frame 18 (FIG. 3) and will not tip down until roller platform 18 is fully extended because of the configuration of wheels and axles. At this point there is no weight on the user with the carrier in position of FIG. 1. Once roller platform 18 is fully extended with a full load (e.g. luggage) it will gradually tip down as the torque resistance of torsion springs 32 is increased. If carrier 14 is empty then the user simply pulls down with their own weight in essence "loading" up the torsion springs for lifting when loaded. When carrier 14 is loaded in the tipped down position of FIG. 2 torsion springs 32 lift the load back to the horizontal position of FIG. 1. At this point the user simply slides carrier 14 onto base frame 12.

Roller platform 18 allows carrier 14 to extend down approximately 38 inches from pivot point 21 which therefore leaves only approximately 16 inches above pivot point 21. This puts the loading point around waist height on an average vehicle. Pivot block 34 is rigidly attached by bolts or is welded to the inside of spring channel 30 which in turn is bolted to roller platform 18.

Figure 4:
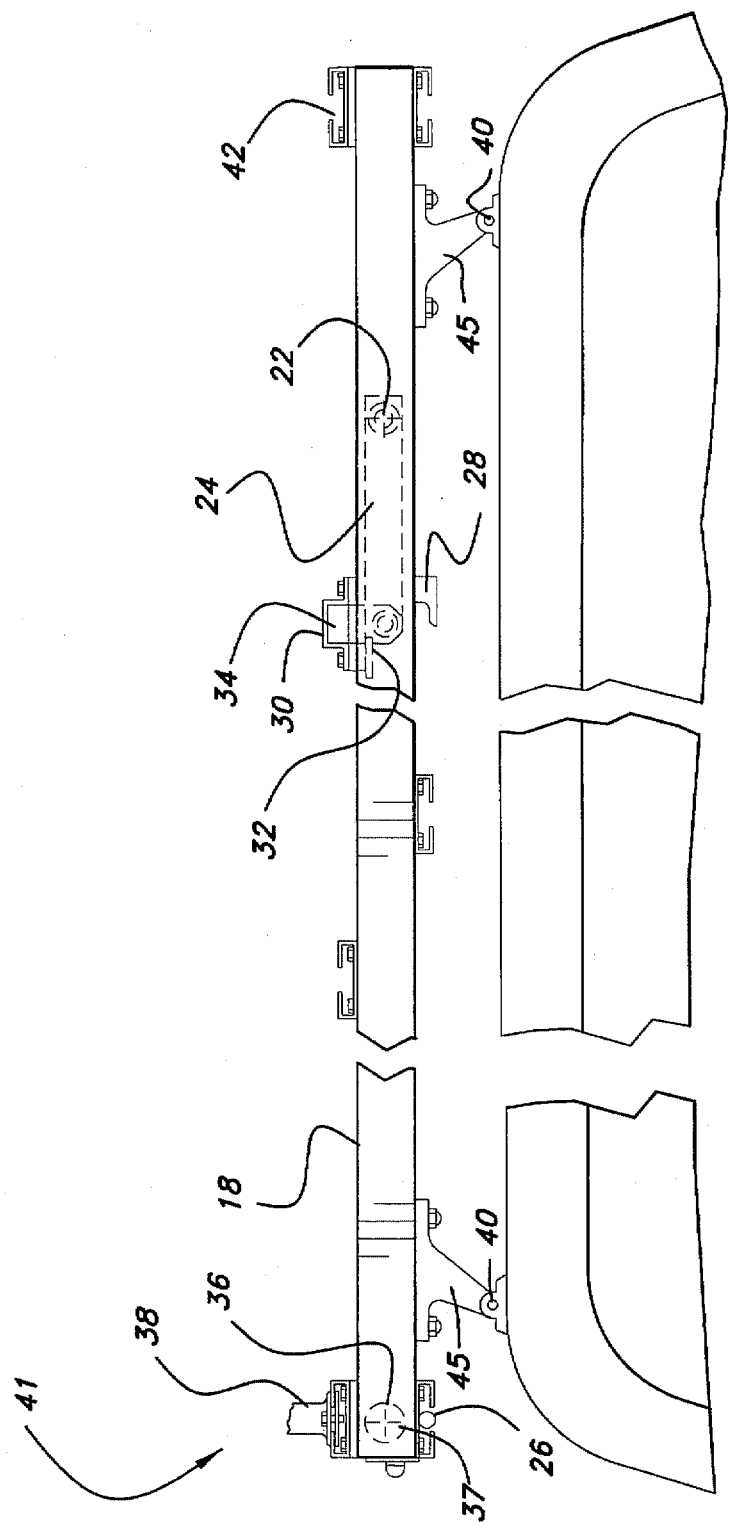
FIG. 4 is a front elevational view showing the vehicle top carrier frames.
Figure 5:
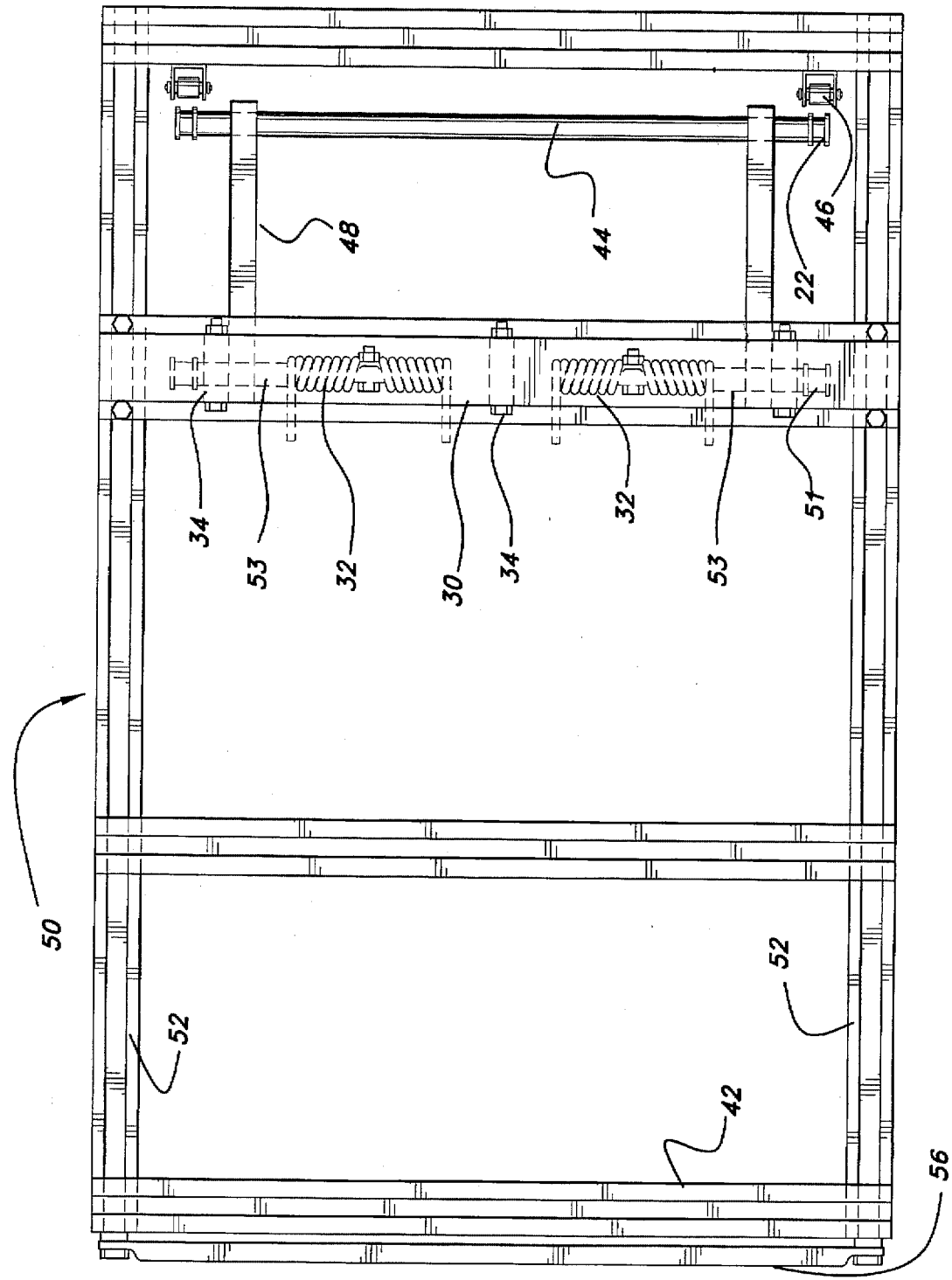
FIG. 5 is a top view of the vehicle top carrier frames.

As best shown in FIG. 5, roller platform 18 is attached to the torsion spring shaft 53 by pivot blocks 34 which extend within spring channel 30. This allows roller platform 18 to rotate downward about pivot point 21 (FIG. 3) when fully extended. Pivot wheel axle 37 (of FIG. 4) is centered in pivot wheel 36 which is mounted at each forward end of base frame 12. Torsion spring 32 is designed to reduce the lifting effort of the loaded carrier 14 to as close to zero as possible without the use of pneumatics or hydraulics. In addition, torsion spring 32 is also designed to require a minimum effort to pull carrier 14 down to the loading position as seen in FIG. 3. For example, four 30 Ft. Lbs torque springs are required for a gross load of 120 pounds which is approximately four large full suit cases. When carrier 14 is pulled to the fully extended position (FIG. 1) zero weight or force is needed to tip carrier 14 down into the loading position (FIG. 2). When carrier 14 is fully loaded latch blocks 28 are released and approximately 20 pounds of force is required to raise carrier 14 as it approaches the horizontal position of FIG. 1. It is possible to get the lifting force to zero by increasing the torque rating of the springs but this would increase the weight required to tip down carrier 14 into the loading position. The advantage of maintaining torque spring 32 at 30 Ft. Lbs each is that it is much easier for the user to pull down using his or her body weight as the force than lifting up using as the force arm and back strength. This allows tip down vehicle top carrier 10 to be user friendly to a 100 pound, 5'2" person or a 250 pound, 6'6" linebacker.

In the configuration of FIGS. 3 and 4, base frame 12 is secured or mounted to the existing luggage rack side rails by brackets 20 or mounts 45 having quick disconnect pins 40 to allow carrier 10 of the present invention to be quickly and easily removed from the vehicle. Within base frame 12 is torque retention bar 24 and hold down wheels 22. Spring channel 30 is dimensioned and configured to handle the torque forces applied to it by torsion springs 32 as roller platform 18 is being tipped down. The location of spring channel 30 in roller platform 18 determines how much of roller platform 18 extends below the roof of the vehicle. The further back spring channel 30 is mounted the closer to the ground roller platform 18 will extend. Furthermore, the further back spring channel 30 is mounted, resulting in a greater lever arm distance, the greater the force required to lift roller platform 18 back to the horizontal position will be.

Cross channel 42 is mounted on roller platform 18 and serves as a "T" slot for mounting any number of carrier devices 38 such as bicycle racks, ski racks, luggage boxes, etc. Latch pin 26 is mounted on base frame 12 on the tip down end 41. Latch pin 26 serves as a striker pin for latch block 28. Latch pin 26 also serves as a limit stop when roller platform 18 is tipped down with a load exceeding the total amount of spring torque of approximately 60 Ft. Lbs. on the two 30 Ft. Lb. model. Latch block 28 is held up against latch pin 26 due to the uplifting force of torsion spring 32 on roller platform 18.

Turning now to FIG. 5 of the drawings, roller frame assembly 50 is shown wherein torsion springs 32 are disposed within spring channel 30. Pivot blocks 34 hold torsion spring shaft 53 within the bushing hole of pivot blocks 34. Torsion spring shaft 53 holds torsion springs 32 in a fixed pre-set position. The length of torsion shaft 53 varies depending on the number of torsion springs 32 installed. Platform drag wheels 46 keep cross channel 42 from dragging on base frame 12 as it is pulled out. Platform drag wheels 46 also aid in the alignment of the roller platform as it is being pulled out. Pivot wheel axle 37 is positioned so that its centerline is in exact alignment with the centerline of the torsion spring axle when torsion spring wheels 51 hit the end stop. Hold down wheels 22 located on each end of hold down shaft 44 run in the base frame side rails and serve to hold torsion spring shaft 53 in a fixed non-rotating position. Torque retention tie bar 48 is solidly attached to both the torsion spring shaft 53 and hold down shaft 44. Torque retention tie bar 48 prevents torsion spring shaft 53 from twisting when pressure from roller platform 18 is applied to torsion springs 32. The torque applied to tie bar 48 by torsion springs 32 is transferred to hold down shaft 44. The upward force on hold down shaft 44 is restricted by hold down wheels 22 being forced up against the inside top of the base side rails. Tie bar 48 also holds the alignment of the wheels 22 as roller platform 18 is extended and retracted. Roller platform handle 56 is used to pull out and push down on roller platform 18.

These carriers can be built using any number of torsion springs consistent with safe loading on top of a vehicle and the structural integrity of the vehicle itself. For commercial applications, power assist devices such as pneumatics or hydraulics could be added to further increase the load capacity.

It is to be understood that the present invention is not limited to the sole embodiment described above, but encompasses any and all embodiments within the scope of the following claims.

I claim:

1. A tip down vehicle top carrier comprising:

mounting means adapted to be attached to the vehicle;

a base frame attached to said mounting means;

a roller platform attached to said base frame;

means to attach a carrier to said roller platform;

said roller platform being capable of extending in a generally horizontal plane while still attached to said base frame; and a torsion spring system to allow a user to pull down said roller platform into a loading position when said roller platform is extended in a generally horizontal plane and to push said roller platform back into a horizontal position by exerting force upon said roller platform by the user.

2. The tip down vehicle top carrier according to claim 1, wherein said torsion spring system comprises:

a plurality of hold down wheels and a plurality of hold down shafts;

a plurality of torsion springs and a plurality of torsion spring shafts;

a torque retention bar which attaches to said plurality of torsion spring shafts and said plurality of hold down shafts;

a torsion spring channel which holds said plurality of torsion spring shafts; and said torsion spring channel handles the torque forces applied to it by said plurality of torsion springs as said roller platform is being tipped down.

3. The tip down vehicle top carrier according to claim 2, wherein said torsion spring system further comprises:

a latch block and a latch pin which serves as a striker pin for the latch block and is a limit stop when said roller platform is tipped down; and a plurality of pivot blocks attached to said torsion spring channel, wherein said plurality of pivot blocks are the pivoting mechanism to tip down said roller platform from an extended horizontal plane.

4. The tip down vehicle top carrier according to claim 1, wherein said means to attach a carrier to said roller platform comprise a "T" shaped cross channel.

5. The tip down vehicle top carrier according to claim 1, wherein said mounting means include a quick disconnect pin.

6. The tip down vehicle top carrier according to claim 1, wherein said torsion spring system includes four 30 Ft. Lb. torsion springs, and wherein when the platform is pulled out in a horizontal plane there is zero weight or force needed to tip said rolling platform down into a loading position and when said carrier is fully loaded to 120 lbs. approximately 20 pounds of force is needed to raise said rolling platform as it approaches a horizontal position.

* * * * *